Oct. 8, 1968     A. EIZENBERG     3,404,683
DISPOSABLE PLASTIC HEMOSTAT
Filed Feb. 23, 1966
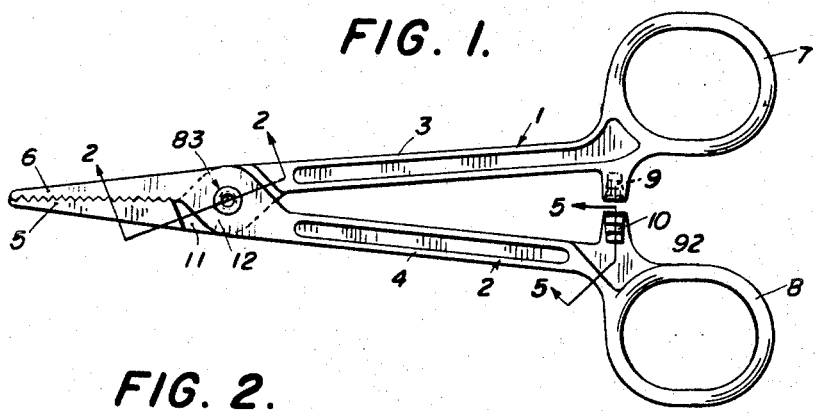
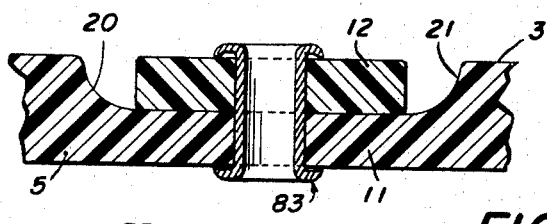
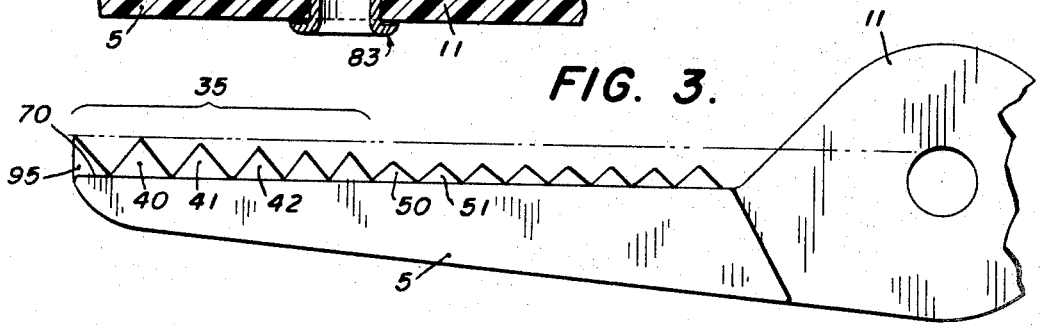
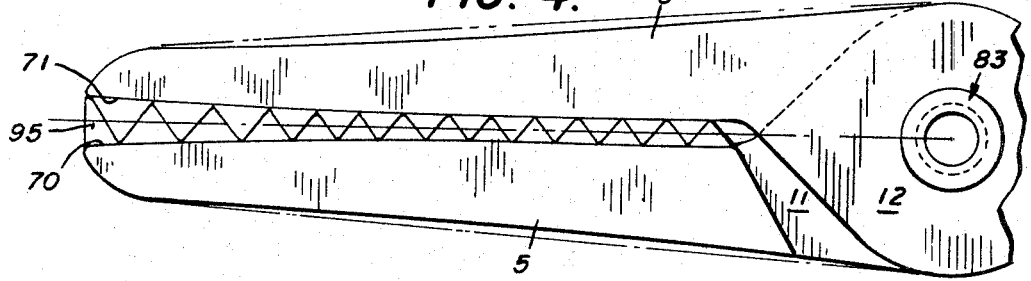
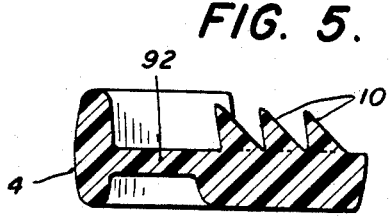
INVENTOR
ARTHUR EIZENBERG
BY
Larry N. Barger
ATTORNEY

3,404,683
DISPOSABLE PLASTIC HEMOSTAT
Arthur Eizenberg, Tarzana, Calif., assignor, by mesne assignments, to American Hospital Supply Corporation, a corporation of Illinois
Filed Feb. 23, 1966, Ser. No. 529,443
11 Claims. (Cl. 128—322)

This invention relates to a disposable plastic hemostat for use in many medical procedures as, for example, suture removal and circumcision procedures. These hemostats are adapted to be supplied to hospitals and doctors' offices presterilized and in an openable package. After a single use, each plastic hemostat is discarded, thus avoiding any possibility of cross-contamination between patients and eliminating the laborious task of rescrubbing and resterilizing each hemostat.

Previous hemostats were very expensive and were hand crafted of forged stainless steel. Making stainless steel hemostats was an art with each craftsman having his own way of grinding, hammering, bending and polishing the stainless steel to form the hemostat. After each use, these reusable stainless steel hemostats had to be tediously scrubbed to remove any blood or mucous embedded in their teeth and then resterilized before being used on a subsequent patient.

In working with disposable hemostats made from plastics in the class of moldable thermoplastics, I have found there are two problem areas which do not cause serious trouble with stainless steel hemostats. The first is gripping of the teeth particularly at their forward ends. The thermoplastic jaws being more flexible than stainless steel jaws can spring outwardly at their forward tip ends when firmly gripped against each other or about an object. I have provided a novel tooth structure on the thermoplastic hemostat jaw to overcome this problem.

The second problem in thermoplastic hemostats is breakage. Stainless steel is relatively unbreakable at clamping forces normally applied to a hemostat. A thermoplastic, on the other hand, is more readily breakable. The structure of the hemostat's critical pivotal area and the particular thermoplastic of my hemostat provide a hemostat that resists breakage.

An object of this invention is to provide a disposable thermoplastic hemostat which reliably grips at its forward end.

Another object of this invention is to provide a disposable thermoplasic hemostat that can firmly grip along an entire length of its jaws without breaking.

Other objects of this invention will become apparent upon further description of the invention with reference to the attached drawings, in which:

FIGURE 1 is a side elevational view of the disposable plastic hemostat;

FIGURE 2 is a sectional view taken along line 2—2 of FIGURE 1;

FIGURE 3 is an enlarged side elevational view of one jaw of the disposable plastic hemostat;

FIGURE 4 is an enlarged side elevational view of both jaws of the disposable plastic hemostat showing them completely closed; and FIGURE 5 is a sectional view taken along line 5—5 of FIGURE 1.

Turning now to the drawings, FIGURE 1 shows the assembled thermoplastic hemostat which comprises two members 1 and 2 pivotally mounted together by a tubular pivot means 83. Member 1 includes I-beam 3 that extends between and is connected to a fingerloop 7 at one end and a jaw 5 at an opposite end. Likewise, member 2 has an I-beam 4 extending between and connected to a fingerloop 8 and a jaw 6. Jaws 5 and 6 are clamped together by forcing fingerloops 7 and 8 toward each other and the jaws are held in clamped position by interconnecting locking means 9 and 10 on each member. Each locking member has a thinned area 92 which is below the teeth tips of locking means 9 and 10 and allows overlap of locking means 9 and 10. This is best shown in FIGURE 5.

In the enlarged view of FIGURE 3, jaw 5 has a forward section 35 with teeth such as 40, 41 and 42 which have a greater height than teeth such as 50 and 51 rearward of this forward section. The teeth in forward section 35 progressively decrease in height from the jaws' forward tip ends rearwardly to blend with teeth rearward of forward section 35. The dotted line parallel to face 70 in FIGURE 3 shows the differences in height of the teeth above face 70 of jaw 5. For illustrative purposes, the height of the teeth in FIGURE 3 has been exaggerated, and preferably a front tooth 40 is between 0.002 to 0.010 inch taller than a rear tooth such as tooth 50. The forward section 35 has a length of from one-eighth to one-half the length of each jaw.

After the teeth in the forward section 35 mesh together, one can cause the teeth along the entire length of jaws 5 and 6 to mesh merely by forcing fingerloops 7 and 8 closer together. This flexes jaws 5 and 6 as shown in FIGURE 4 and jaw faces 70 and 71 become slightly convex. The teeth along the jaw's entire length firmly mesh before the thermoplastic material of the hemostat reaches its breaking point.

With the jaws closed as in FIGURE 4, the plastic hemostat is under considerable stress. This stress is transferred from fingerloops 7 and 8 along beams 3 and 4 to jaws 5 and 6. If any point in the hemostat fails under this stress the hemostat is rendered useless. Each beam has a thinned pivotal section shown as 11 on beam 3 and as 12 on beam 4 which can transmit a clamping force to the jaws without breaking. The thinned pivotal portions 11 and 12 are approximately one half the thickness of the adjoining beam portion and jaw and integrally connect to each of these at smoothly contoured fillets 20 and 21, respectively. Members 1 and 2 are identical to each other except the teeth of one jaw are offset one half the linear distance between crowns of adjacent teeth so the teeth of the two jaws mesh in a crown to root relationship. To provide an even front tip for gripping, one jaw has a half tooth 95. Thus, two members can be pivotally connected together at their thinned pivotal portions 11 and 12, leaving a height in this pivotal area approximately equal to the height of the adjoining portions of the beams and jaws. This structure gives a smoothly contoured hemostat as desired for medical purposes.

The thermoplastic of a hemostat must not be so limber that the jaws will not grip and also must not be brittle. I have obtained very good results in a hemostat as described above made of polystyrene containing 20% to 45% by weight of glass fibers from one-eighth to one-half inch in length. This combination gives hemostat members with jaws that firmly grip, but which are not brittle. Also, a styrene-acrylonitrile copolymer containing 20% to 45% glass fibers from one-eighth to one-half inch in length may be used.

In the above specification, I have described my invention in terms of a specific embodiment. It is understood that those skilled in the art will readily recognize certain modifications that can be made to this embodiment without departing from the spirit and scope of this invention.

I claim:
1. A disposable hemostat comprising: a pair of pivotally connected members of thermoplastic material, each member having a beam connected to a fingerloop at one end and to a jaw at an opposite end, each jaw having a face with a series of teeth thereon adapted to engage the teeth of the opposite jaw, at least one of said jaws having a forward section adjacent a forward tip end thereof with teeth of a greater height than teeth rearward of said forward section, which rearward teeth engage each other subsequent to engagement of teeth of the forward section upon flexure of said jaws caused by urging the fingerloops toward each other.

2. A disposable hemostat as set forth in claim 1 wherein the teeth in the forward section decrease in height progressively from front to rear of said forward section.

3. A disposable hemostat as set forth in claim 1 wherein the forward section is from one-eighth to one-half the length of said jaw.

4. A disposable hemostat as set forth in claim 1 wherein at least one tooth in the forward section is from 0.002 to 0.010 inch taller than at least one tooth rearward of said forward section.

5. A disposable hemostat comprising: a pair of pivotally connected members of thermoplastic material containing from 20% to 45% glass fibers by weight, each member having a beam connected to a fingerloop at one end and to a jaw capable of flexure at an opposite end, said jaws having a series of teeth which engage each other first at the jaws' forward tip ends and then progressively rearwardly upon the flexure of said jaws caused by forcing the fingerloops towards each other.

6. A disposable hemostat as set forth in claim 5 wherein the glass fibers are from one-eighth to one-half inch in length.

7. A disposable hemostat as set forth in claim 5 wherein the thermoplastic material is selected from the group consisting of polystyrene and styrene-acrylonitrile copolymer.

8. A disposable hemostat comprising a pair of pivotally connected members of thermoplastic material, each member having a beam connected to a fingerloop at one end and to a jaw at an opposite end, said beam having a thinned pivotal section integrally joined to said jaw, which pivotal section is approximately one-half the thickness of the jaw and has a smoothly contoured fillet between the pivotal section and jaw; said jaws having a series of teeth which engage each other first at forward tip ends of the jaws and then progressively rearwardly upon the flexure of said jaws caused by forcing the fingerloops toward each other; the fillets of said beams spreading stress across the pivotal section to insure the teeth adjacent a rearward end of the jaws will engage each other prior to the thermoplastic material of said hemostat reaching its breaking point.

9. A disposable hemostat as set forth in claim 8 wherein the thinned pivotal section also has a smoothly contoured fillet joining it to an adjacent section of the beam which is approximately twice as thick as said thinned pivotal section.

10. A disposable hemostat as set forth in claim 8 wherein each member is identical to the other with the exception of the teeth in one jaw being offset one-half the linear distance between crowns of adjoining teeth so the teeth of two jaws mesh in a crown to root relationship.

11. A disposable hemostat comprising: a pair of pivotally connected members of a thermoplastic material containing 20% to 45% glass fibers by weight, which glass fibers are from one-eighth to one-half inch in length; each member having a beam connected to a fingerloop at one end and to a jaw at an opposite end, said beam having a thinned pivotal section integrally joined to said jaw, which pivotal section is approximately one-half the thickness of the jaw and has a smoothly contoured fillet between the thinned pivotal section and said jaw; each jaw having a face with a series of teeth thereon adapted to engage the teeth of the opposite jaw, said jaws each having a forward section adjacent a forward tip end of the jaw, which forward section is from one-eighth to one-half the length of the jaw, at least one tooth in the forward section being from 0.002 to 0.010 inch taller than at least one tooth rearward of said forward section; said teeth engaging each other first at the forward tip ends of the jaws and then progressively rearwardly upon the flexure of said jaws caused by forcing the fingerloops toward each other.

References Cited

UNITED STATES PATENTS

| | | | |
|---|---|---|---|
| 1,852,542 | 4/1932 | Sovatkin | 128—325 |
| 2,669,993 | 2/1954 | Curutchet | 128—321 |
| 3,101,715 | 8/1963 | Glassman | 128—322 |
| 3,140,715 | 7/1964 | Whitton et al. | 128—321 |

LAWRENCE W. TRAPP, *Primary Examiner.*